United States Patent
Norrman et al.

(10) Patent No.: US 11,792,025 B2
(45) Date of Patent: Oct. 17, 2023

(54) METHODS OF VERIFYING THAT A FIRST DEVICE AND A SECOND DEVICE ARE PHYSICALLY INTERCONNECTED

(71) Applicant: Telefonaktiebolaget LM Ericsson (publ), Stockholm (SE)

(72) Inventors: Karl Norrman, Stockholm (SE); Elena Dubrova, Sollentuna (SE); Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 775 days.

(21) Appl. No.: 16/471,973

(22) PCT Filed: Feb. 10, 2017

(86) PCT No.: PCT/EP2017/052955
§ 371 (c)(1),
(2) Date: Jun. 20, 2019

(87) PCT Pub. No.: WO2018/145755
PCT Pub. Date: Aug. 16, 2018

(65) Prior Publication Data
US 2020/0099541 A1   Mar. 26, 2020

(51) Int. Cl.
*H04L 9/32* (2006.01)
*G06F 7/58* (2006.01)
(Continued)

(52) U.S. Cl.
CPC .......... *H04L 9/3278* (2013.01); *G06F 7/588* (2013.01); *H04L 9/0866* (2013.01); *H04W 12/06* (2013.01);
(Continued)

(58) Field of Classification Search
CPC . H04L 9/0866; H04L 9/3278; H04L 2209/12; H04L 63/0876; H04W 12/06;
(Continued)

(56) References Cited

U.S. PATENT DOCUMENTS 6,418,490 B1   7/2002   Foster, Sr.
8,868,923 B1 *  10/2014   Hamlet .................. G06F 21/00
                                                        326/8
(Continued)

FOREIGN PATENT DOCUMENTS

WO   2007063473 A1   6/2007
WO   2007063475 A2   6/2007

OTHER PUBLICATIONS

First European Office Action dated Sep. 10, 2020 for EP Application No. 17705333.7, 8 pages.
(Continued)

*Primary Examiner* — Eric W Shepperd
(74) *Attorney, Agent, or Firm* — SAGE PATENT GROUP (57) ABSTRACT

A method of verifying that a first device and a second device are physically interconnected is disclosed. The method is performed by a verifier and includes sending a challenge R1 to the first device, for use as basis for input to a first physical unclonable function, PUF, —part of the first device, receiving, a response, RES1, from the second device, the response RES1 being based on an output of a second PUF part of the second device, and verifying that the first device and the second device are interconnected for the case that the received response, RES1, and an expected response fulfills a matching criterion. A method in a first device and a method in a second device and corresponding devices, computer programs and computer program products are also disclosed.

20 Claims, 6 Drawing Sheets

(51) Int. Cl.
*H04L 9/08* (2006.01)
*H04W 12/06* (2021.01)
*H04W 12/12* (2021.01)

(52) U.S. Cl.
CPC ......... *H04W 12/12* (2013.01); *H04L 2209/12* (2013.01)

(58) Field of Classification Search
CPC ..... H04W 12/12; H04W 12/48; H04W 12/50; H04W 12/71
See application file for complete search history.

(56) References Cited

U.S. PATENT DOCUMENTS

| | | | | |
|---|---|---|---|---|
| 9,667,520 | B2* | 5/2017 | Nakano | A61B 6/563 |
| 10,002,362 | B1* | 6/2018 | Endress | H04L 9/3247 |
| 10,177,922 | B1* | 1/2019 | Hamlet | H04L 9/3278 |
| 10,256,983 | B1* | 4/2019 | Bauer | H04L 9/0861 |
| 2005/0149740 | A1* | 7/2005 | Kotzin | H04W 12/069 713/185 |
| 2009/0217045 | A1* | 8/2009 | Skoric | H04L 9/3234 713/172 |
| 2010/0073147 | A1* | 3/2010 | Guajardo Merchan | G06K 19/07309 340/10.51 |
| 2010/0127822 | A1* | 5/2010 | Devadas | H04L 9/3278 726/2 |
| 2012/0290845 | A1* | 11/2012 | Bares | H04L 9/3247 713/170 |
| 2013/0082733 | A1* | 4/2013 | Shimizu | H04L 9/3278 326/8 |
| 2013/0133031 | A1* | 5/2013 | Fainstein | G06F 21/44 726/2 |
| 2014/0279532 | A1* | 9/2014 | Tremlet | G06F 21/73 705/325 |
| 2015/0058928 | A1 | 2/2015 | Guo et al. | |
| 2015/0195088 | A1* | 7/2015 | Rostami | H04L 9/3278 380/28 |
| 2015/0215115 | A1* | 7/2015 | Pikus | H04L 9/3278 380/30 |
| 2015/0317481 | A1* | 11/2015 | Gardner | G06F 21/57 726/2 |
| 2016/0092313 | A1* | 3/2016 | Kruglick | G06F 21/73 707/649 |
| 2016/0182045 | A1* | 6/2016 | Mai | H04L 9/3278 326/8 |
| 2017/0134175 | A1* | 5/2017 | Skudlarek | H04L 9/3278 |
| 2018/0102909 | A1* | 4/2018 | Wu | H04L 9/3278 |

OTHER PUBLICATIONS

International Search Report and Written Opinion dated Oct. 6, 2017 for International Application No. PCT/EP2017/052955 filed on Feb. 10, 2017, consisting of 11-pages.

* cited by examiner

METHODS OF VERIFYING THAT A FIRST DEVICE AND A SECOND DEVICE ARE PHYSICALLY INTERCONNECTED

CROSS-REFERENCE TO RELATED APPLICATIONS

This application is a Submission Under 35 U.S.C. § 371 for U.S. National Stage Patent Application of International Application Number: PCT/EP2017/052955, filed Feb. 10, 2017 entitled "METHODS OF VERIFYING THAT A FIRST DEVICE AND A SECOND DEVICE ARE PHYSICALLY INTERCONNECTED," the entirety of which is incorporated herein by reference.

TECHNICAL FIELD

The technology disclosed herein relates generally to the field of authentication, and in particular to methods for verifying that a first device and a second device are physically interconnected, a verifier, a first device, a second device, computer programs and computer program products.

BACKGROUND

Figure 1:
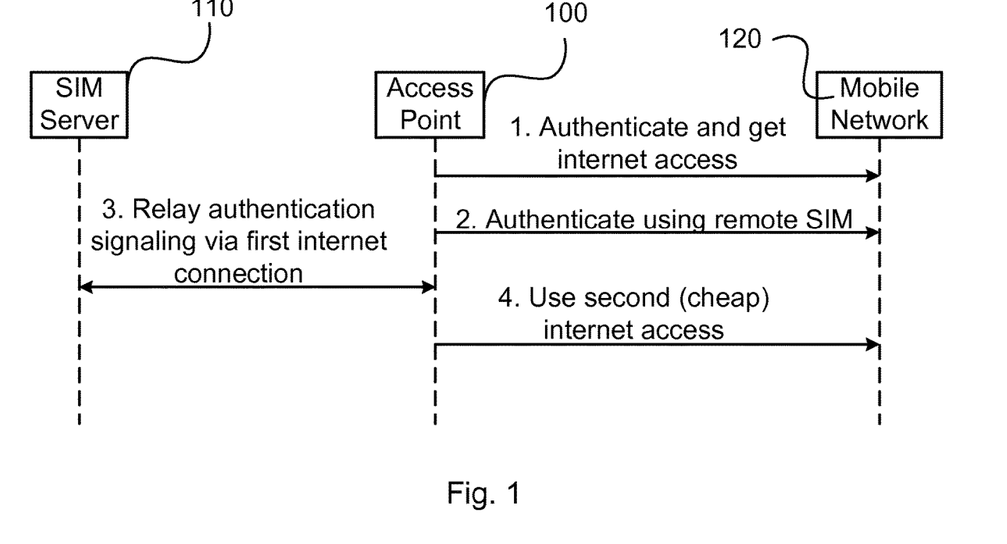
FIG. 1 is a sequence diagram illustrating a fraud scenario.

FIG. 1 illustrates an example of a common type of fraud within a wireless communications system: subscription fraud. As an exemplary scenario, a fraudster sells an access point 100 in a first country A and promises a buyer that the access point 100 will provide internet access in a second country B. The access point 100 comprises a Subscriber Identity Module (SIM) slot in which a first SIM card can be inserted, the first SIM card having a subscription with a potentially expensive data plan should it be used in the second country B. The first SIM card enables the access point 100 to obtain internet access (Arrow 1) in country A using a mobile network 120. Next, the access point 100 makes another connection to the mobile network 120 for internet access, but this time the access point 100 claims to be another device which the mobile network associates with a second different SIM card. This second SIM card has a flat rate data plan. It is inserted in a SIM server no, which can be located at the fraudster's premises in the first country A. When the mobile network 120 (for the second time) authenticates the access point 100, the access point 100 uses the first internet connection to forward the authentication signaling back to the SIM server no. Once the authentication is completed, the access point 100 can use the second—flat rate—payment plan for internet access. The power of this fraud comes from that many access points can use the same SIM server no and hence share the flat rate payment plan.

The above exemplary scenario illustrates a long-standing subscription fraud problem in telecommunication industry, wherein there is a need for ensuring that a SIM card (comprising subscription parameters) is indeed located within a device, e.g. within a smart phone, to which the subscription is tied.

Another area of access control technologies in which close physical proximity is important is Digital Rights Management (DRM), wherein usage of proprietary hardware and copyrighted works is to be prevented. In this case, a tamper resistant decryption unit may be used to decrypt received media, but it needs to be connected to a rendering device to show, for instance, images. In order to prevent that multiple households in the same neighborhood share the same decryption unit (and thus subscription), it is important that the decryption device and the rendering device are physically close. A specific example on this is Internet Protocol (IP)-based set-top boxes comprising a key, e.g. on a smartcard, that is used for decrypting protected content.

While it is known how to verify various properties of devices on a computational level (for instance, whether they have access to a specific authentication key), verifying physical proximity is difficult for the case of removable devices such as, for instance, a SIM card. Obviously, it can be guaranteed that a device cannot be removed from another device by, for example, permanently engaging the two devices in a way which cannot be reversed. However, this requires strong physical protection of the devices so that cryptographic information, stored therein and used to ensure their connection, cannot be extracted and the devices thereby be cloned. Further, it is often desirable to have removable devices such as SIM cards, and also have identity modules that can be soldered or integrated with a circuit board. In general, it is important to be able to verify that two devices have not been separated or that they for the moment are in each other's vicinity.

From the above it is clear that there is a lack of suitable mechanisms for assuring physical proximity, which lack may lead to attacks in which, for instance, a SIM card is removed from a smart phone and run remotely. There is a need for mechanisms for remotely and reliably verifying whether two (or more) devices are physically close.

SUMMARY

An objective of the present teachings is to address the above described shortcomings. A particular objective is to enable verification of that two separate physical devices are indeed physically interconnected. Another objective is to enable such verification in a secure way leaving no room for tampering with the devices. These objectives and others are achieved by the methods, devices, computer programs and computer program products according to the appended independent claims, and by the embodiments according to the dependent claims.

The objective is according to an aspect achieved by a method of verifying that a first device and a second device are physically interconnected. The method is performed by a verifier and comprises sending a challenge to the first device, for use as basis for input to a first physical unclonable function, PUF, —part of the first device, receiving a response from the second device, the response being based on an output of a second PUF part of the second device, and verifying that the first device and the second device are interconnected for the case that the received response and an expected response fulfills a matching criterion.

The method provides a way of verifying that physically separate devices are physically interconnected, in particular close together. An advantage is that the method may be used to ensure, for instance, that a SIM card is located inside a wireless device such as a mobile phone. This is an important use case since it solves long-standing subscription fraud problems for the telecom industry.

The objective is according to an aspect achieved by a computer program for a verifier. The computer program comprises computer program code, which, when run on at processing circuitry of the verifier causes the verifier to perform the method as above.

The objective is according to an aspect achieved by a computer program product comprising a computer program as above and a computer readable means on which the computer program is stored.

The objective is according to an aspect achieved by a verifier for verifying that a first device and a second device are physically interconnected. The verifier is configured to: send a challenge to the first device, for use as basis for input to a first physical unclonable function, PUF, —part of the first device, receive, a response from the second device, the response being based on an output of a second PUF part of the second device, and verify that the first device and the second device are interconnected for the case that the received response and an expected response fulfills a matching criterion.

The objective is according to an aspect achieved by a method of enabling verification of that a first device and a second device are physically interconnected. The method is performed by the first device and comprises receiving a first challenge, generating, based on the received first challenge, a second challenge, inputting the second challenge to a first physical unclonable function, PUF, —part arranged in the first device, and providing, to a second PUF part arranged in the second device, an output from the first PUF part over a physical interconnection interconnecting the first PUF part and the second PUF part.

The objective is according to an aspect achieved by a computer program for a first device. The computer program comprises computer program code, which, when run on at processing circuitry of the first device causes the first device to perform the method as above.

The objective is according to an aspect achieved by a computer program product comprising a computer program as above and a computer readable means on which the computer program is stored.

The objective is according to an aspect achieved by a first device for enabling verification of that the first device and a second device are physically interconnected. The first device is configured to: receive a first challenge, generate, based on the received first challenge, a second challenge, input the second challenge to a first physical unclonable function, PUF, —part arranged in the first device, and provide, to a second PUF part arranged in the second device, an output from the first PUF part over a physical interconnection interconnecting the first PUF part and the second PUF part.

The objective is according to an aspect achieved by a method of enabling verification of that a first device and a second device are physically interconnected. The method is performed by a second device and comprises: receiving, in a second physical unclonable function, PUF, —part arranged in the second device, a third challenge; receiving, in the second PUF part arranged in the second device, an output from a first PUF part arranged in the first device; obtaining, in response to the third challenge and the output from the first PUF part, a response; and sending the response to a verifier.

The objective is according to an aspect achieved by a computer program for a second device. The computer program comprises computer program code, which, when run on at processing circuitry of the second device causes the second device to perform the method as above.

The objective is according to an aspect achieved by a computer program product comprising a computer program as above and a computer readable means on which the computer program is stored.

The objective is according to an aspect achieved by a second device for enabling verification of that a first device and the second device are physically interconnected. The second device is configured to: receive, in a second physical unclonable function, PUF—part arranged in the second device, a third challenge; receive, in the second PUF part, an output from a first PUF part arranged in the first device; obtain, in response to the third challenge and the output from the first PUF part, a response RES1, and send the response RES1 to a verifier.

Further features and advantages of the embodiments of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide a thorough understanding of the present teachings, some aspects of Physically Unclonable Function (PUF) are given in the following.

A PUF is a physical entity embodied in a physical device (e.g. an integrated circuit (IC) or chip) which exploits the inherent process variations in the physical device to produce a response which is easy to compute by the PUF, but hard to predict for a PUF-external entity. Furthermore, an individual PUF is expected to be easy to manufacture, but practically impossible to duplicate, even if repeating the manufacturing process that fabricated the PUF, since various parameters, e.g. temperature, material impurities, etc. may vary during the manufacturing affecting the individual PUFs differently.

In a general setting, and from a computational perspective, a PUF implements a random mapping, i.e., it generates a response RES to a given challenge R. Without access to the PUF it is practically impossible to predict which RES corresponds to which R. If implemented properly, a PUF of a given device/chip is expected to provide the same response to a same challenge, at least within the expected bound on the number of erroneous bits in the response (some bits may flip). There are known methods on how to design reliable PUFs and how to correct (or to tolerate) errors in its output responses.

PUFs have been proposed as a low-cost cryptographic primitive for device identification, challenge-response authentication, and secret key generation. Compared to conventional key storage approaches based on memories, PUFs are claimed to provide a higher level of tamper-resistance against invasive attacks. This is because the response of a PUF is likely to change when a PUF is tampered with.

Most PUF Integrated Circuits (ICs) developed up to now can be divided into two categories: delay-based (e.g., ring oscillator PUFs and arbiter PUFs) and memory-based (e.g., SRAM (Static Random-Access Memory) PUFs). In the description, the former (delay-based PUFs and specifically arbiter PUFs) are used for describing various embodiments.

Figure 2:
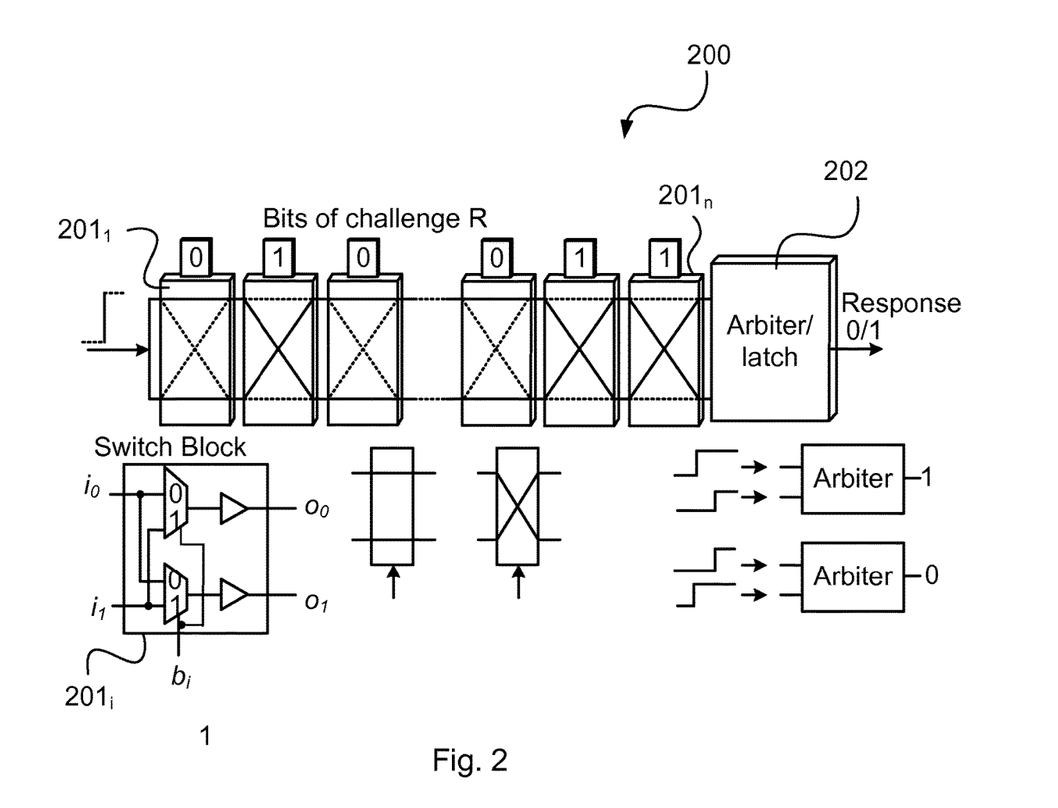
FIG. 2 illustrates a structure of an arbiter PUF.

FIG. 2 illustrates a structure of an arbiter PUF 200. The arbiter PUF 200 is an example of a PUF implementing a random mapping from an n-bit challenge R to a single-bit response. An input challenge comprising N bits gives a single bit output (uppermost illustration in FIG. 2). In particular, the challenge is input to a number of switch blocks $200_1, \ldots, 200_i, \ldots, 200_n$ (one shown in more detail in lower leftmost illustration) and produces an output (indicated as Response 1/0). The arbiter PUF 200 creates a race between two symmetrically designed delay paths. Due to the naturally occurring variations in the features of elements when integrated circuits are fabricated, a signal passing two paths will arrive at the inputs of an arbiter 202 at (slightly) different time. An output response bit of 0 or 1 is then generated by the arbiter 202 depending on which path is the faster one. The input is applied bit-wise to each of the switch blocks $200_1, \ldots, 200_1, \ldots, 200_n$ of the arbiter PUF 200. Depending on whether a bit input to a switch block $200_i$ is zero or one, the switch block $200_i$ either does or does not swap the two input signals.

An m-output arbiter PUF can be designed either by running m different single-bit output arbiter PUFs in parallel, or by running the same single-output arbiter PUF m times with m different challenges applied to its inputs and accumulating the resulting single output bits. It is common to use a Linear-feedback shift register (LFSR) with an initial challenge as a seed to generate the subsequent challenges. In this context it may be noted that while describing PUFs as a single unit, each PUF may be constructed by combining multiple PUFs, e.g. by combining several PUFs in parallel or sequentially.

PUFs can be further sub-divided in modellable and non-modellable PUFs. For a modellable PUF, there exists a model whose description size is (considerably) smaller than the size of the mapping implemented by the PUF. For example, an n-input arbiter PUF is fully described by the delays of its n stages, which are 2 per stage (composed of delays of logic elements and interconnect as described above), or 2 n delays in total. There is an even smaller model of an arbiter PUF, based on differences on delays of individual stages. It uses n+1 delay differences to model an n-stage arbiter PUF.

For non-modellable PUFs, no model whose description size is (considerably) smaller than the size of the mapping implemented by the PUF exists (or known at present).

Modellable PUFs have some advantages and some disadvantages. A great advantage of modellable PUFs is that there is no need to pre-compute and store a set of challenge-response pairs (R, RES) to be used for challenge-response authentication when the PUF is manufactured and before it is deployed. For non-modellable PUFs, this in necessary, since there is no other way of verifying if the response RES generated by a PUF is a valid or not. Moreover, the pairs (R, RES) are a finite resource that will eventually be depleted. For modellable PUFs, the verifier who knows the PUF model can simulate the response of a PUF for any randomly selected challenge. This eliminates the need to the (large) database and/or a mechanism for updating the set of (R, RES) pairs once the database is exhausted.

However, this advantage of modellable PUFs opens up a door for so called modelling attacks: an adversary who can observe a large number of challenge and response pairs of a PUF can apply, e.g. machine learning techniques, to create a model of the PUF. Once a model is created, the adversary can simulate the response to any challenge. To avoid modelling attacks, the responses of a modellable PUF should be protected using some cryptographically secure techniques. For example, a cryptographic hash or a Message Authentication Code (MAC) of the PUF output RES can be submitted as a response to a challenge instead of RES itself. Alternatively, the PUF output can be protected by encrypting RES using, for example Advanced Encryption Standard (AES) and a fixed key stored in the PUF (e.g. IC). It is noted that should an attacker try to extract the stored key from the PUF (e.g. IC), the physical characteristics of the PUF (e.g. IC) are likely to change, and the PUF responses with them. Therefore, there is no additional weakness to store the key in the PUF (e.g. IC) and use it this way. Another PUF can be used for the AES-key storage to have a higher assurance on key's tamper-resistance.

It is noted that it is not currently possible to create a model of a delay-based PUF, such an arbiter PUF, by direct probing an interconnection of a switch box since an attempt to probe an interconnection will change its electrical parameters and hence its delay using today's technology. Only modelling attacks in which a large number of (cryptographically unprotected) challenge-response pairs are observed by the attacker can enable the attacker to derive a PUF model.

Briefly, the present teachings suggest using PUFs (also referred to as physical unclonable functions) as a way to physically "bind devices together". Methods are provided for remotely verifying that the two devices are physically interconnected, which, as a side-effect, also authenticates the involved devices to the verifier.

For simplicity, the particular case of two devices is used herein for describing various aspects, but it is noted that the teachings herein may be extended to more than two devices.

Figure 3:
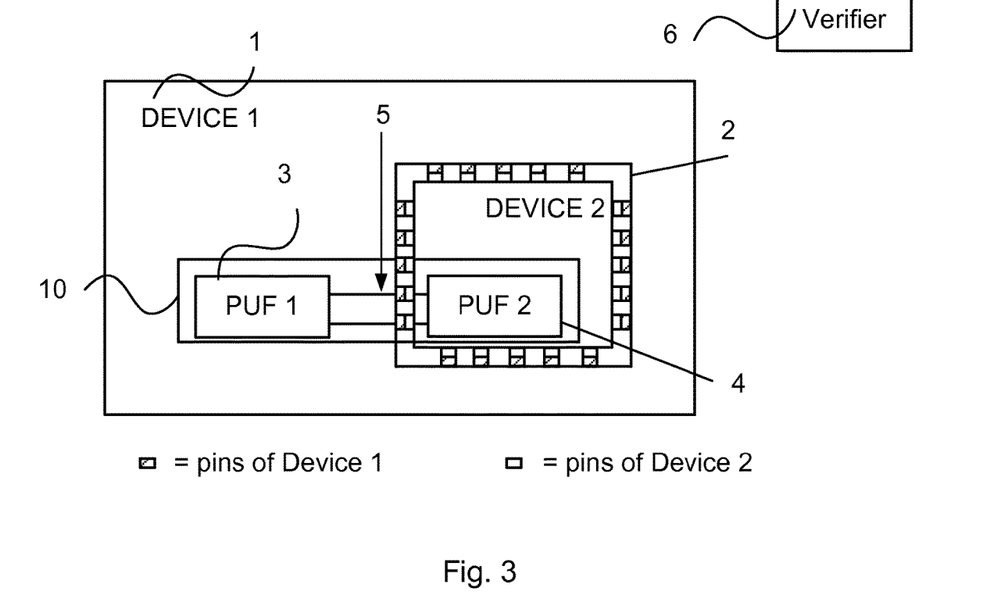
FIG. 3 illustrates an interconnection of two devices according to embodiments of the present teachings.

FIG. 3 illustrates an interconnection of two devices according to embodiments of the present teachings. Two devices 1, 2 are to be bound together (e.g. a smart phone and a SIM card), such that a verifier can remotely verify that they are indeed interconnected by some physical means. A first device 1 (DEVICE 1) and a second device 2 (DEVICE 2), each comprises a part of a composed PUF 10: the first device 1 comprises a first PUF part 3 (PUF 1) and the second device 2 comprises a second PUF part 4 (PUF 2). Each PUF part 3, 4 may, in practice, comprise one or more PUFs. In the following (as noted earlier), wherever PUFs are mentioned they may, in practice, comprise a single PUF or be constructed by combining multiple PUFs in parallel.

The two PUF parts 3, 4 are interconnected through a physical connection 5. The physical interconnection 5 may, for instance, comprise one or more or busses, cables, wires and/or pins. The physical interconnection 5 and the two PUF parts 3, 4 form the composed PUF 10. A challenge R (not shown) is applied to the composed PUF 10, which generates a response RES (not shown) as part of a method (or protocol) described later. Owing to the uniqueness of the PUF responses for a given PUF (e.g. for a given chip) and the PUFs' unclonability, the response of the composed PUF 10 will be the same as the expected response only if the two devices (i.e. the two PUF parts 3, 4) are connected by the physical connection. If the second device 2 is removed and run remotely, the response of the composed PUF 10 will differ from the expected response. The herein disclosed solution thereby offers an efficient way of checking that two physically separate devices (or separable) are physically close together, e.g. that a SIM card is indeed located inside a mobile phone and not run remotely. This enables prevention of a number of fraud schemes in, e.g., telecom and media distribution, examples of which were given in the background section.

This problem cannot be solved by, for instance, use a message authentication code (MAC) which is "partitioned" into two parts, MAC1 and MAC2 which are computed in the first device 1 and the second device 2 respectively, and then compose together MAC1 and MAC2. This is because, in such case the results of two parts of the MAC could be computed remotely (e.g. in the phone and in a SIM box) and then combined (logically). In the PUF case suggested herein, the results cannot be combined logically. They can only be combined physically, through a physical bus connecting the two halves 3, 4. Otherwise, the result of the PUF computation will not be the same. So, the PUF binds, for instance, the SIM and the mobile phone physically together (in this particular example, they cannot be spatially separated). A MAC does not give this guarantee because it works with logical values that can be transported over any distance.

The problem of verifying that two devices are interconnected cannot be solved by having the first device 1 ask the second device 2 to compute a MAC and return the response within a given expected time, which is measured using a local timer in the first device 1. In such case, there might be ways to tamper with the local timer in the first device 1 to prevent it from keeping an accurate account of time it, unless some tamper-proofed method is used to protect the chip of the second device 2. The herein described solution is not dependent on a timer and is less costly to implement. It is also noted that a PUF takes much less area and consumes less power than a MAC.

Next, further embodiments according to the present teachings are described.

A method is provided for verifying that devices are physically close together, and in particular that they are physically interconnected. The term "device" here refers to any type of equipment such as, for instance, computer, smart-card, circuit board, integrated circuit, mobile phone or any other electric device. Without loss of generality embodiments of a method are described for the case of two devices, but it is noted that it could be generalized to any number of devices.

With reference again to FIG. 3 a typical use case is described. The first device 1 may be a mobile phone and the second device 2 may be a SIM card. In the disclosed method, it is verified that the first device 1 and the second device 2 are physically interconnected by means of separate pieces of hardware comprising the earlier described composed (modellable) PUF 10 implementing a random mapping partitioned into parts (the first PUF part 3 and the second PUF part 4). In this particular example and in typical cases this physical interconnection also means physical proximity.

As described earlier, the first PUF part 3 is located in the first device 1, and the second PUF part 4 is located in the second device 2. The first PUF part 3 and second PUF part 4 are physically interconnected by means of a physical connection, e.g. by means of two buses, Bus 1 and Bus 2, through pins of the first device 1 and the second device 2. The buses can be viewed as a third part of the composed PUF 10, because their delays (together with the delay of corresponding pins) contribute to the value of the final response of the composed PUF 10. This is important since it implies that if the first PUF part 3 and the second PUF part 4 communicate by other means than the particular physical interconnection means (Bus 1 and Bus 2 in the illustrated case) the responses of the composed PUF 100 will be different.

Figure 4:
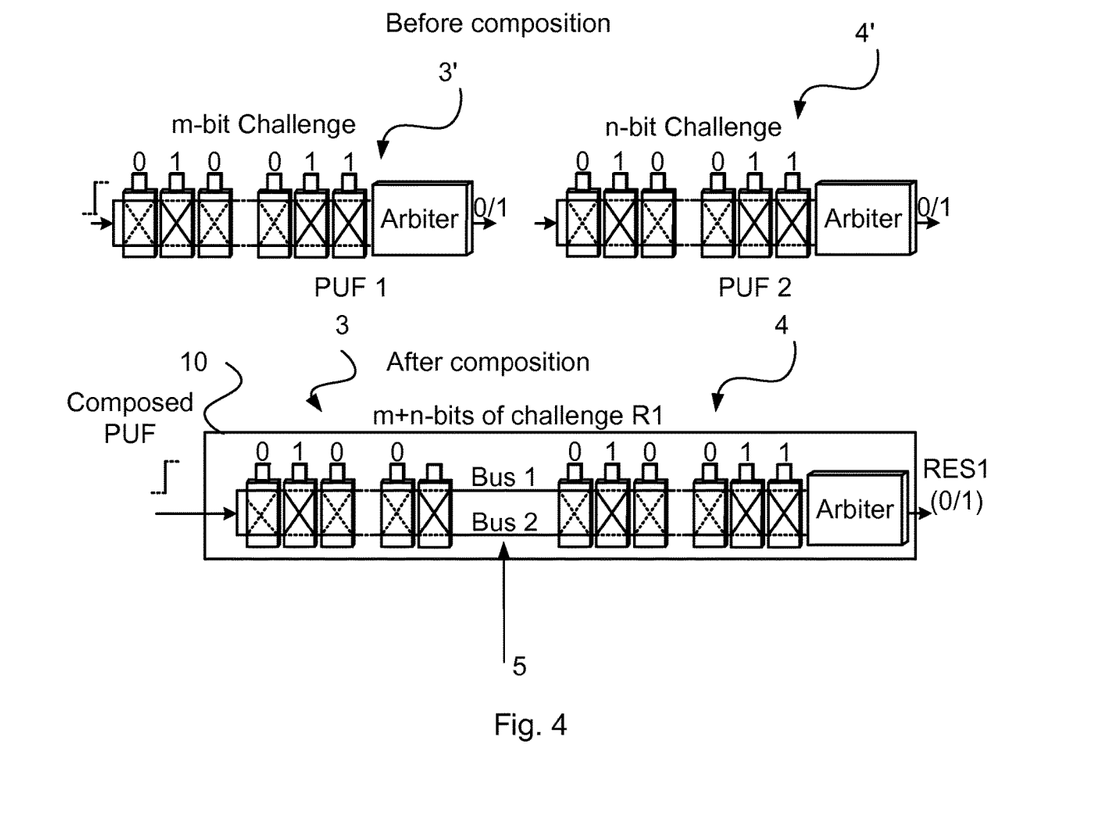
FIG. 4 illustrates embodiments according to the present teachings.

FIG. 4 illustrates embodiments according to the present teachings, and in particular how the composed PUF 10 may be composed from its two PUF parts 3, 4, physical interconnection 5 and more details on the example of the arbiter PUF. It is however noted that in principle any modellable PUF can be used which can be partitioned so that the communication between the two PUF parts 3, 4 is performed using signals carrying some physical/electrical parameter which get affected if tampering is attempted (e.g. delay in case of the arbiter PUFs).

In the uppermost part of FIG. 4, the first and second PUF parts 3', 4' are shown before composition to the composed PUF 10. The first PUF part 3 may be obtained from an arbiter PUF 3' by removing its arbiter block. The second PUF part 4 may be obtained from another arbiter PUF 4' by removing the pulse signal which is fed into the first switch block. The two parts are interconnected physically using, for instance two buses, as shown in FIG. 4, connecting through the pins of the first device 1 and the pins of the second device 2. The composed PUF 10 is shown at the lowermost part of FIG. 4.

Similar to a conventional arbiter PUF, the resulting composed PUF 10 creates a race between two symmetrically designed delay paths. An output response bit of 0 or 1 is generated by the arbiter depending on which path is faster. However, the output response from the composed PUF 10 depends not only on the delays of switch boxes in the first and second PUF parts 3, 4, but also on the delays of the physical interconnection 5 (Bus 1 and Bus 2 in the illustrated case) and the delays of the corresponding pins. If the second device 2 is removed from the first device 1 and run remotely, then the response of the composed PUF 10 will be different from the expected one.

In order to verify the physical interconnection of the first and second devices 1, 2 a random challenge R1 is provided by a verifier. The random challenge R1 should be large enough to provide input for both PUF parts 3, 4. This challenge R1 is used as a seed to a pseudo-random number generator available in the first and second devices 1, 2. The pseudo-random number generator may, for instance, be an LFSR (not necessarily cryptographically secure), and generates the following k−1 challenges R2, R3, . . . , Rk. These k challenges are subsequently applied as inputs to the first and second PUF parts 3, 4 and k single-bit output responses of the composed PUF 10, RES1, RES2, . . . , RESk are computed and accumulated.

In some embodiments, the challenge R1 is not used directly as input to the composed PUF 10, but instead only used as seed to generate all k challenges. The resulting k-bit response is a combination of the output responses RESi for $1 \leq i \leq k$. The combination may be a concatenation of RESi, or be the result of running the outputs through a function, such as a hash function. The combination of the output responses RESi may then be protected by cryptographic means, e.g. by encrypting it, or hashing it, or computing a MAC over it, and then sent to the verifier. The verifier then needs access to the necessary keying material to compute the corresponding functions. The physical interconnection is verified by comparing this response to the expected one, which is computed from the models of the first and second PUF parts 3, 4, and knowledge of the delays of Bus 1, Bus 2 and the corresponding pins, by the verifier.

The models of the first and second PUF parts 3, 4 are created by the manufacturer/third party after the manufacturing of the first and second devices 1, 2 by measuring and recording the delay of the stages of the first PUF part 3 and the stages of the second PUF part 4. The delays of Bus 1, Bus 2 and the corresponding pins (or generally delays of the physical interconnection 5) are also measured and recorded by the manufacturer/third party after the manufacturing of the first and second devices 1, 2. It is noted that care should be taken to tolerate potential differences in the delays of Bus 1, Bus 2 and the corresponding pins due to the potentially different ways the first device 1 is inserted into the second device 2. However, it is likely that these differences affect the delays of Bus 1, Bus 2 and the corresponding pins in a similar way. For instance, it is likely that their delays get increased by a same/close Δt because the SIM (second device 2) is inserted into the phone (first device 1) more loosely or tightly and therefore do not change the outcome of racing.

A technology which implements the physical interconnection 5 (e.g. busses and pins) in a way which minimizes the effect on the response of the composed PUF 10 from different ways of inserting the first device 1 into the second device 2 are preferred embodiments. It would also be beneficial if the delays of the physical interconnection 5 (e.g. Bus 1, Bus 2 and the corresponding pins) do not get affected by wear-out/aging during the expected life time of the devices 1, 2, or, if they do, they get affected in the same way, e.g. increase/reduce by the same/close value. In case the first device 1 and the second device 2 are mounted on the same printed circuit board (PCB) it is possible to keep the electrical properties of the two buses under control. It is also possible, e.g., by multilayer PCBs to have a stable aging of the buses during the life-time of the product and have the buses protected from environmental influences.

If the verification passes, i.e. if the input challenge R1 gives the expected result RES, the physical interconnection test is successful. If verification fails, an alert can be raised and acted upon and/or the result can be logged.

Since the responses of the composed PUF 10 are protected by a traditional cryptographic one-way function, an adversary cannot create a model for the composed PUF 10. Since the adversary does not have the model of PUF, he cannot predict the expected response to a given challenge.

In some embodiments, a p-output is used instead of single-output first PUF part 3 (PUF1) and second PUF part 4 (PUF2), wherein p is the degree of parallelization of computing the responses. That is, using p different copies of a single-output PUFs in parallel and they are connected using 2 p busses instead of 2 (e.g. as many as a SIM card can afford) to reduce the time for verification p times.

In some embodiments, the PUF output response RES1 size is made equal to the input challenge R1 size and the verification is run in a loop a predetermined number of times, by applying the computed response as the challenge at the next loop iteration.

In the embodiments described above, the second PUF part 4 of the second device 2 comprises the arbiter and hence computes the output bit of the composed PUF 10. This implies that the cryptographic mechanism which is used for protecting PUF outputs should be provided in the second device 2. In other embodiments, the first and second PUF parts 3, 4 are swapped, so that the first PUF part 3 is contained in the second device 1 and second PUF part 4 is contained in the first device 1. In this case, the cryptographic mechanism which is used for protecting PUF outputs should be contained in the first device 1. In any case, unprotected output of the arbiter block should not be communicated between the first and second devices 1, 2 since it can be tapped by an adversary (noting that the logic value produced by the arbiter block may not be tamper-resistant any longer).

The various embodiments and features that have been described can be combined in many different ways, examples of which are given in the following.

Figure 5:
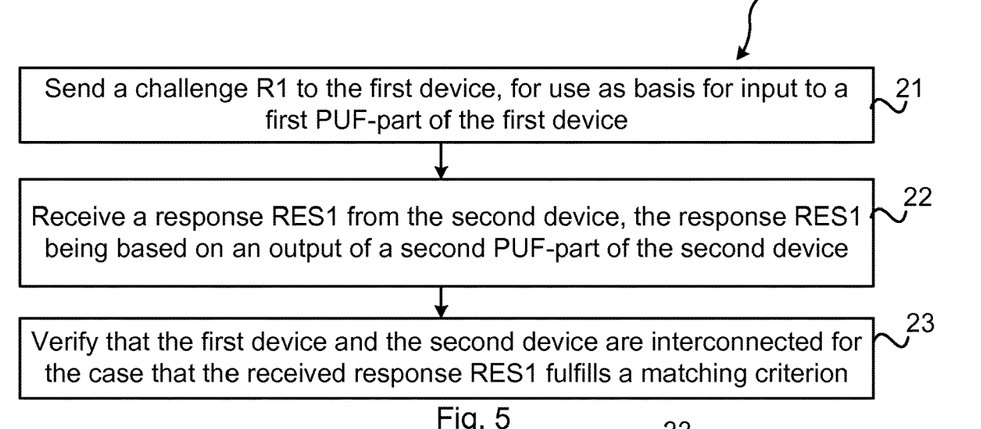
FIG. 5 illustrates a flow chart over steps of an embodiment of a method performed by a verifier in accordance with the present teachings.

FIG. 5 illustrates a flow chart over steps of an embodiment of a method performed by a verifier in accordance with the present teachings. A method 20 of verifying that a first device 1 and a second device 2 are physically interconnected is provided. The method 20 is performed by a verifier 6, which may be e.g. an authentication node of a communications network (e.g. wireless communications network) wanting to ensure that a certain subscription is used by a specified device (to which the subscription is tied). In other instance, the verifier 6 is user-operated device such as a smart phone or computer or other device by means of which data (in particular a challenge) can be sent.

The method 20 comprises sending 21 a challenge R1 to the first device 1, for use as basis for input to a first physical unclonable function, PUF, —part 3 of the first device 1.

The method 20 comprises receiving 22, a response, RES1, from the second device 2, the response RES1 being based on an output of a second PUF part 4 of the second device 2.

The method 20 comprises verifying 23 that the first device 1 and the second device 2 are interconnected for the case that the received response, RES1, and an expected response fulfills a matching criterion.

The verification is performed by a verifier with access to challenge-response pairs (challenge, expected response). The verifier sends the challenge to the first device. The first and second devices run the input through a composed PUF 10 and return the result to the verifier. If the verifier sees a match between the received result and the expected response, the verifier may safely conclude that the first and second devices are close together. The response of the composed PUF depends on the propagation time of the parts that are composed and thereby gives the expected response only if the PUF parts 3, 4 are physically interconnected. If the PUF parts 3, 4 are separated, the value of the composed PUF will change because the PUF parts 3, 4 will be connected through another medium with different electrical/transmission parameters. It is noted that the response from the second device may be conveyed to the verifier 6 via any intermediate device. For instance, if the second device 2 is a SIM card (comprising a second PUF part) and the first device 1 is a wireless device (comprising a first PUF part), then the response may be provided by the second device 2 (i.e. SIM card) to the verifier 6 via transmission circuitry of the first device 1 (i.e. of the wireless device).

In an embodiment, the verifying 23 comprises comparing the received response RES1 to a response of a challenge-response pair and verifying that the first device 1 and the second device 2 are interconnected when the received response RES1 and the response of the challenge-response pair fulfills the matching criterion. That is, the response of the challenge-response pair is the expected response, and in case of the received response RES1 and this expected response fulfills the matching criterion it is verified that the first device 1 and the second device 2 are indeed physically interconnected.

In some embodiments, the matching criterion comprises the received response, RES1, differing from the expected response (which may, for instance, be a response of a challenge-response pair), by less than a defined number of bits. Such embodiments takes into account that some bits may be erroneous, e.g. may flip.

Figure 6:
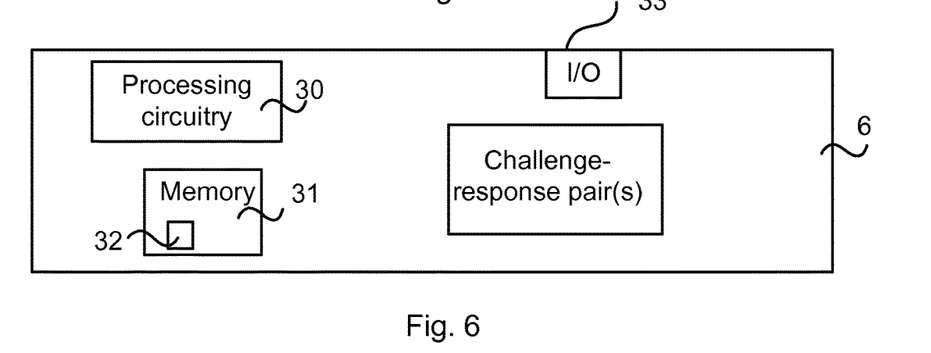
FIG. 6 illustrates a verifier and means for implementing embodiments of the method in accordance with the present teachings.

FIG. 6 illustrates a verifier and means for implementing embodiments of the method in accordance with the present teachings.

The verifier 6 comprises processing circuitry 30, which may be any combination of one or more of a suitable central processing unit (CPU), multiprocessor, microcontroller, digital signal processor (DSP), etc., capable of executing software instructions stored in a computer program product 32, e.g., in the form of a storage medium 31. The processing circuitry 30 may further be provided as at least one application specific integrated circuit (ASIC), or field programmable gate array (FPGA).

The processing circuitry 30 is configured to cause the verifier 6 to perform a set of operations, or steps, e.g. as described in relation to FIG. 5. For example, the storage medium 31 may store the set of operations, and the processing circuitry 30 may be configured to retrieve the set of operations from the storage medium 30 to cause the verifier 6 to perform the set of operations. The set of operations may be provided as a set of executable instructions. The processing circuitry 30 is thereby arranged to execute methods as disclosed herein.

The storage medium 31 may also comprise persistent storage, which, for example, can be any single one or combination of magnetic memory, optical memory, solid state memory or even remotely mounted memory.

The verifier 6 may also comprise an input/output device 33 for communicating with other entities and devices, e.g. with a first device 1 (and in particular a first PUF part thereof). The input/output device 33 may be an interface and may, for instance, comprise a protocol stack, for communication with other devices or entities. The input/output device 33 may be used for receiving data input and for outputting data.

The verifier 6 may comprise a storage for storing a number of challenge-response pairs, wherein the challenge of one such pair is sent to the first device and the response is used in the in the verification for matching of it to a received response.

A verifier 6 is provided for verifying that a first device 1 and a second device 2 are physically interconnected. The verifier 6 is configured to:
send a challenge R1 to the first device 1, for use as basis for input to a first physical unclonable function, PUF, —part 3 of the first device 1,
receive, a response, RES1, from the second device 2, the response RES1 being based on an output of a second PUF part 4 of the second device 2, and
verify that the first device 1 and the second device 2 are interconnected for the case that the received response, RESi, and an expected response fulfills a matching criterion.

The verifier 6 may be configured to perform the above steps e.g. by comprising processing circuitry 30 and memory 31, the memory 31 containing instructions executable by the processing circuitry 30, whereby the verifier 6 is operative to perform the steps. That is, in an embodiment, a verifier 6 is provided. The verifier 6 comprises processing circuitry 30 and memory 31, the memory 31 containing instructions executable by the processing circuitry 30, whereby verifier 6 is operative to: send a challenge to the first device, for use as basis for input to a first physical unclonable function, PUF, —part of the first device; receive, a response from the second device, the response being based on an output of a second PUF part of the second device; and verify that the first device and the second device are interconnected for the case that the received response and an expected response fulfills a matching criterion.

In an embodiment, the verifier 6 is configured to verify by comparing the received response RES1 to a response of a challenge-response pair and verifying that the first device 1 and the second device 2 are interconnected when the received response RES1 and the response of the challenge-response pair fulfills the matching criterion.

In some embodiments, the matching criterion comprises the received response, RES1, differing from the expected response (which may, for instance, be a response of a challenge-response pair) by less than a defined number of bits.

Figure 7:
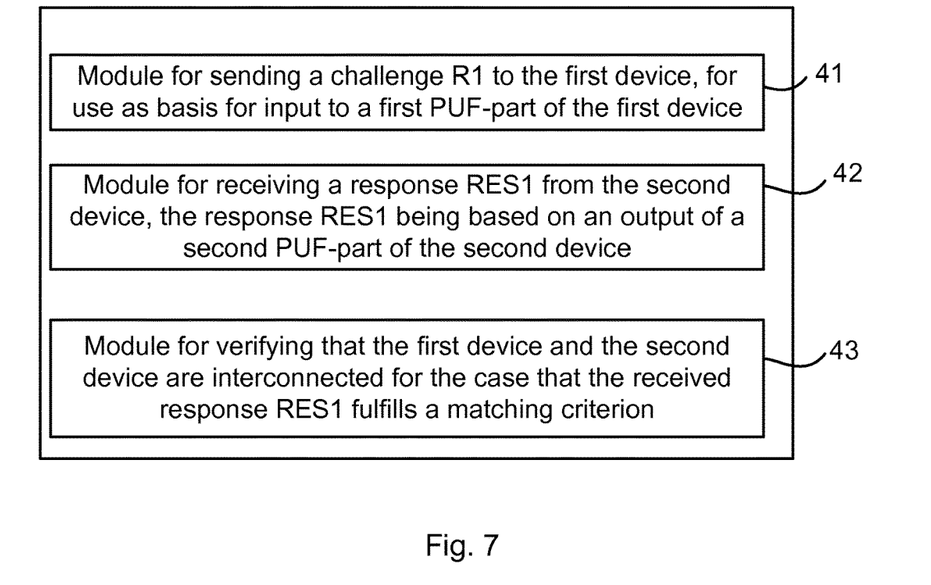
FIG. 7 illustrates a verifier comprising function modules/software modules for implementing embodiments of the present teachings.

FIG. 7 illustrates a verifier comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described in various embodiments.

A verifier 6 is provided for verifying that a first device 1 and a second device 2 are physically interconnected. The verifier comprises a first module 41 for sending a challenge to the first device, for use as basis for input to a first physical unclonable function, PUF, —part of the first device. The first module 41 may, for instance, comprise an output device for transmitting data, e.g. a communication interface, transmitting circuitry or a data transmitting output device.

The verifier 6 comprises a second module 42 for receiving, a response from the second device, the response being based on an output of a second PUF part of the second device. The second module 42 may, for instance, comprise an input device for receiving data, e.g. a communication interface, receiving circuitry or a data receiving input device.

The verifier 6 comprises a third module 43 for verifying that the first device and the second device are interconnected for the case that the received response and an expected response fulfills a matching criterion. The third module 43 may, for instance, comprise processing circuitry adapted to perform a verification procedure involving a matching criterion.

It is noted that one or more of the modules 41, 42, 43 may be replaced by units.

Figure 8:
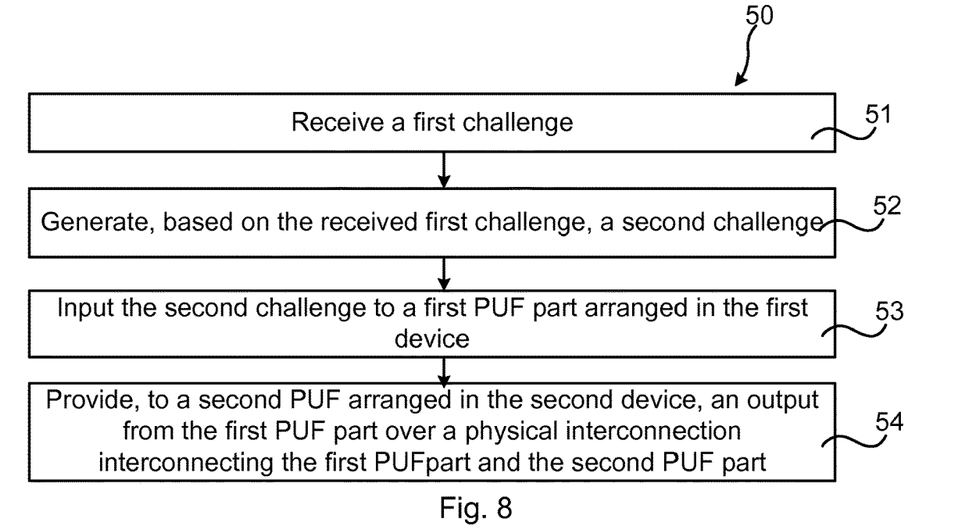
FIG. 8 illustrates a flow chart over steps of an embodiment of a method performed by a first device in accordance with the present teachings.

FIG. 8 illustrates a flow chart over steps of an embodiment of a method performed by a first device in accordance with the present teachings. A method 50 of enabling verification of that a first device 1 and a second device 2 are physically interconnected is provided. The method 50 is performed by the first device 1, which, for instance, may comprise a wireless communication device or a set-top box.

The method 50 comprises receiving 51 a first challenge R1. The first challenge R1 may be received from a verifier 6 or from the second device 2.

The method 50 comprises generating 52, based on the received first challenge, a second challenge.

The method 50 comprises inputting 53 the second challenge to a first physical unclonable function, PUF, —part 3 arranged in the first device 1.

The method 50 comprises providing 54, to a second PUF part 4 arranged in the second device 2, an output from the first PUF part 3 over a physical interconnection 5 interconnecting the first PUF part 3 and the second PUF part 4.

In an embodiment, the generating 52 comprises inputting at least part of the received first challenge R1 to a pseudo-random number generator outputting the second challenge. In such embodiments, part of the first challenge is used as a seed to generate the second challenge, while the rest may be used as seed to obtain a third challenge.

Figure 9:
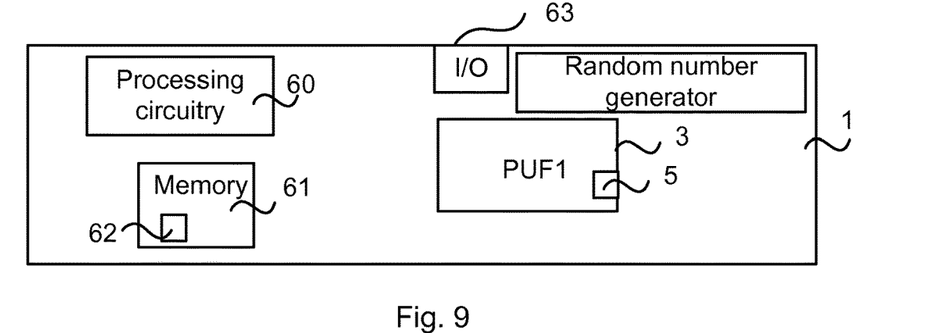
FIG. 9 illustrates a first device and means for implementing embodiments of the method in accordance with the present teachings.

FIG. 9 illustrates a first device and means for implementing embodiments of the method in accordance with the present teachings.

The first device 1 comprises processing circuitry 60, which may be any combination of one or more of a suitable central processing unit (CPU), multiprocessor, microcontroller, digital signal processor (DSP), etc., capable of executing software instructions stored in a computer program product 62, e.g., in the form of a storage medium 61. The processing circuitry 60 may further be provided as at least one application specific integrated circuit (ASIC), or field programmable gate array (FPGA).

The processing circuitry 60 is configured to cause the first device 1 to perform a set of operations, or steps, e.g. as described in relation to FIG. 8. For example, the storage medium 61 may store the set of operations, and the processing circuitry 60 may be configured to retrieve the set of operations from the storage medium 60 to cause the first device 1 to perform the set of operations. The set of operations may be provided as a set of executable instructions. The processing circuitry 60 is thereby arranged to execute methods as disclosed herein.

The storage medium 61 may also comprise persistent storage, which, for example, can be any single one or combination of magnetic memory, optical memory, solid state memory or even remotely mounted memory.

The first device 1 may also comprise an input/output device 63 for communicating with other entities and devices, e.g. with the verifier 6. The input/output device 63 may be an interface and may, for instance, comprise a protocol stack, for communication with other devices or entities. The input/output device 63 may be used for receiving data input and for outputting data.

The first device 1 comprises the described first PUF part 3, which first PUF part 3 can be interconnected to a second PUF part 4 by means of an interconnection device 5.

A first device 1 is provided for enabling verification of that the first device 1 and a second device 2 are physically interconnected. The first device 1 may, for instance, be a wireless communication device and comprise a first PUF part 3 of the PUF composure 10 that have been described.

The first device 1 is configured to:
receive a first challenge R1,
generate, based on the received first challenge, a second challenge,
input the second challenge to a first physical unclonable function, PUF, —part 3 arranged in the first device 1, and
provide, to a second PUF part 4 arranged in the second device 2, an output from the first PUF part 3 over a physical interconnection 5 interconnecting the first PUF part 3 and the second PUF part 4.

In an embodiment, the first device 1 is configured to generate the second challenge by inputting at least part of the received first challenge R1 to a pseudo-random number generator outputting the second challenge.

The first device 1 may be configured to perform the above steps e.g. by comprising processing circuitry 60 and memory 61, the memory 61 containing instructions executable by the processing circuitry 60, whereby the first device 1 is operative to perform the steps. That is, in an embodiment, a first device 1 is provided. The first device 1 comprises processing circuitry 60 and memory 61, the memory 61 containing instructions executable by the processing circuitry 60, whereby first device 1 is operative to: receive a first challenge R1, generate, based on the received first challenge, a second challenge, input the second challenge to a first physical unclonable function, PUF, —part arranged in the first device, and provide, to a second PUF part arranged in the second device, an output from the first PUF part over a physical interconnection interconnecting the first PUF part and the second PUF part.

Figure 10:
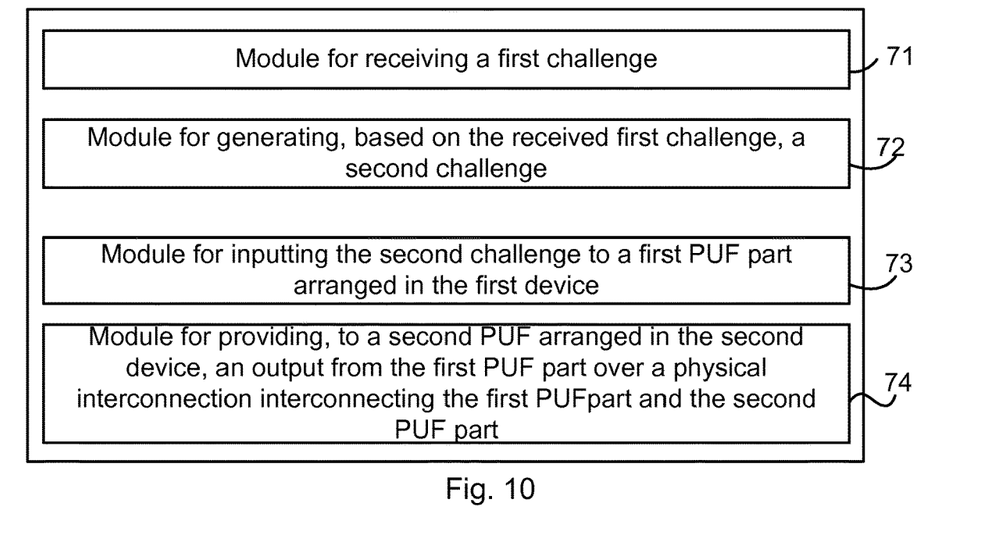
FIG. 10 illustrates a first device comprising function modules/software modules for implementing embodiments of the present teachings.

FIG. 10 illustrates a first device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 50 that has been described in various embodiments.

A first device is provided for enabling verifying that the first device 1 and a second device 2 are physically interconnected. The first device comprises a first module 71 for receiving a first challenge. The first module 71 may, for instance, comprise an input device for receiving data, e.g. a communication interface, receiving circuitry or a data reception input device.

The first device comprises a second module 72 for generating, based on the received first challenge, a second challenge. The second module 72 may, for instance, comprise processing circuitry adapted to generate a challenge.

The first device comprises a third module 73 for inputting the second challenge to a first physical unclonable function, PUF, —part arranged in the first device 1. The third module may, for instance, comprise a communication interface or an input/output device.

The first device comprises a fourth module 74 for providing, to a second PUF part arranged in the second device, an output from the first PUF part over a physical interconnection interconnecting the first PUF part and the second PUF part. The fourth module 74 may comprise the physical interconnection device 5 described earlier.

In is noted that one or more of the modules 71, 72, 73, 74 may be replaced by units.

Figure 11:
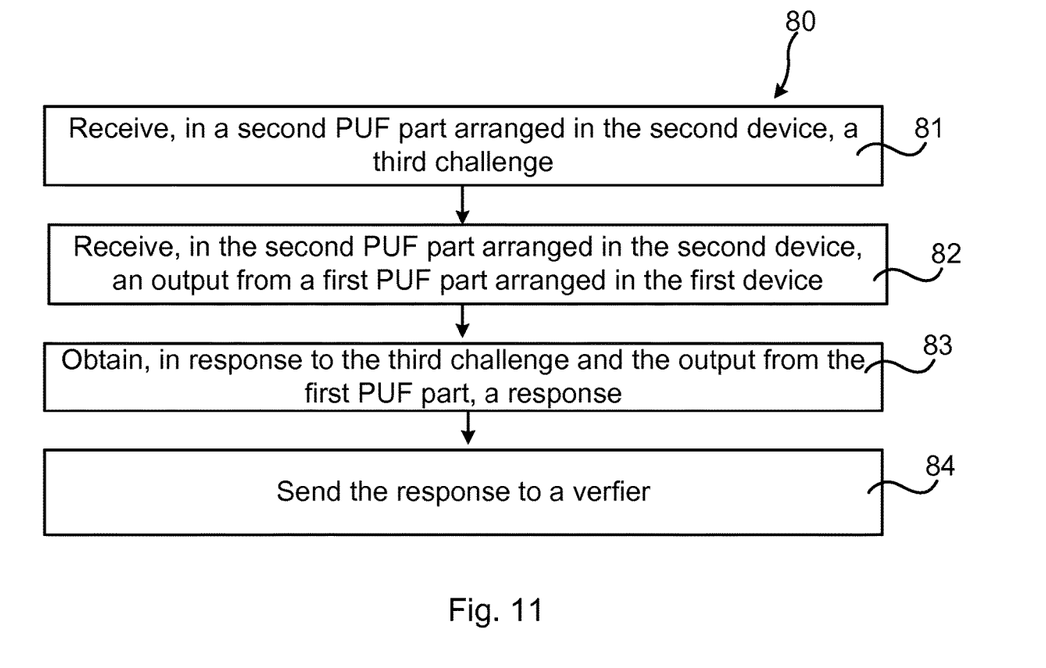
FIG. 11 illustrates a flow chart over steps of an embodiment of a method performed by a second device in accordance with the present teachings.

FIG. 11 illustrates a flow chart over steps of an embodiment of a method performed by a second device in accordance with the present teachings. A method 80 of enabling verification of that a first device 1 and a second device 2 are physically interconnected is provided. The method 80 is performed by a second device 2 and comprises:

receiving 81, in a second physical unclonable function, PUF, —part 4 arranged in the second device 2, a third challenge, receiving 82, in the second PUF part, an output from a first PUF part 3 arranged in the first device 1, obtaining 83, in response to the third challenge and the output from the first PUF part 4, a response RES1, and sending 84 the response RES1 to a verifier 6.

The third challenge in the receiving 81 step may be a challenge received from the first device 1 or from the verifier. In some embodiments, the third challenge may be based on a seed based on at least a part of the first challenge which is expanded by a pseudo-random number generator of the second device 2, the output of which is then the third challenge input to the second PUF part 4.

In an embodiment, the sending 84 comprises sending the response RES1 to the verifier 6 via the first device 1.

In an embodiment the method 80 comprises, before the sending 84, encrypting the response RES1.

Figure 12:
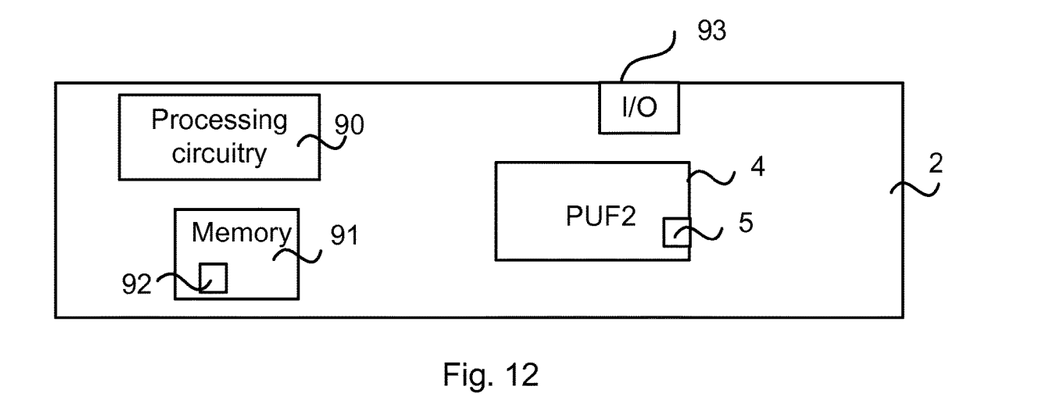
FIG. 12 illustrates a second device and means for implementing embodiments of the method in accordance with the present teachings.

FIG. 12 illustrates a second device and means for implementing embodiments of the method in accordance with the present teachings.

The second device 2 comprises processing circuitry 90, which may be any combination of one or more of a suitable central processing unit (CPU), multiprocessor, microcontroller, digital signal processor (DSP), etc., capable of executing software instructions stored in a computer program product 92, e.g., in the form of a storage medium 91. The processing circuitry 90 may further be provided as at least one application specific integrated circuit (ASIC), or field programmable gate array (FPGA).

The processing circuitry 90 is configured to cause the second device 2 to perform a set of operations, or steps, e.g. as described in relation to FIG. 11. For example, the storage medium 91 may store the set of operations, and the processing circuitry 90 may be configured to retrieve the set of operations from the storage medium 90 to cause the second device 2 to perform the set of operations. The set of operations may be provided as a set of executable instructions. The processing circuitry 90 is thereby arranged to execute methods as disclosed herein.

The storage medium 91 may also comprise persistent storage, which, for example, can be any single one or combination of magnetic memory, optical memory, solid state memory or even remotely mounted memory.

The second device 2 may also comprise an input/output device 93 for communicating with other entities and devices, e.g. with the verifier 6, either directly or via e.g. the first device 1. The input/output device 93 may be an interface and may, for instance, comprise a protocol stack, for communication with other devices or entities. The input/output device 93 may be used for receiving data input and for outputting data.

The second device 2 comprises the described second PUF part 4, which second PUF part 3 can be interconnected to a first PUF part 3 by means of an interconnection device 5.

A second device 2 is provided for enabling verification of that a first device 1 and the second device 2 are physically interconnected. The second device 2 is configured to:

receive, in a second physical unclonable function, PUF, —part 4 arranged in the second device 2, a third challenge, receive, in the second PUF part 4, an output from a first PUF part 3 arranged in the first device 1, obtain, in response to the third challenge and the output from the first PUF part 3, a response RES1, and send the response RES1 to a verifier 6.

The second device 2 may be configured to perform the above steps e.g. by comprising processing circuitry 90 and memory 91, the memory 91 containing instructions executable by the processing circuitry 90, whereby the second device 2 is operative to perform the steps. That is, in an embodiment, a second device 2 is provided. The second device 2 comprises processing circuitry 90 and memory 91, the memory 91 containing instructions executable by the processing circuitry 90, whereby second device 2 is operative to: receive, in a second physical unclonable function, PUF, —part arranged in the second device, a third challenge, obtain, in response to the third challenge and the output from the first PUF part, a response, and send the response to a verifier.

In an embodiment, the second device 2 is configured to send the response RES1 to the verifier 6 via the first device 1.

In an embodiment, the second device 2 is configured to, before the sending, encrypt the response RES1.

Figure 13:
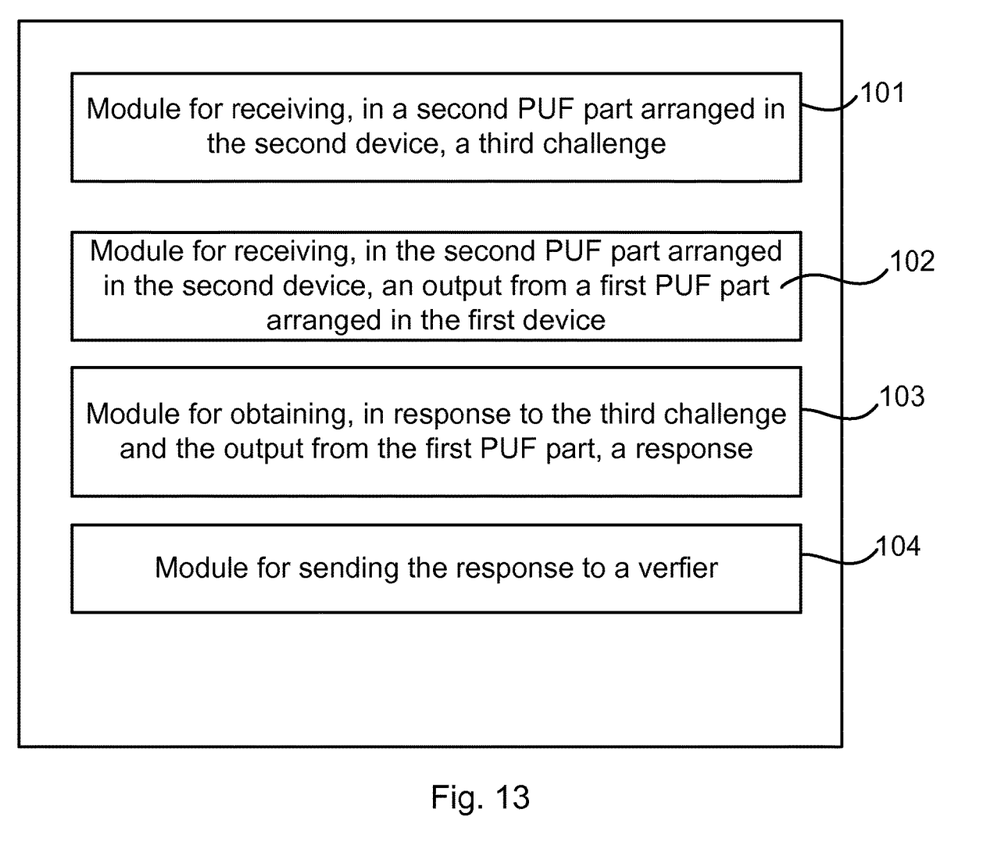
FIG. 13 illustrates a second device comprising function modules/software modules for implementing embodiments of the present teachings.

FIG. 13 illustrates a second device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 80 that has been described in various embodiments.

A second device is provided for enabling verifying that the first device and the second device are physically interconnected. The second device comprises a first module 101 for receiving, in a second physical unclonable function, PUF, —part arranged in the second device, a third challenge. The first module 101 may, for instance, comprise an input device of the second device conveying a signal received from the first device to the second PUF part arranged in the second device.

The second device comprises a second module 102 for receiving, in the second physical unclonable function, PUF, —part arranged in the second device, an output from a first PUF part arranged in the first device. The second module 102 may, for instance, comprise the physical interconnection device 5 described earlier.

The second device comprises a third module 103 for obtaining, in response to the third challenge and the output from the first PUF part, a response. The third module 103 may, for instance, comprise processing circuitry adapted for obtaining the response.

The second device comprises a fourth module 104 for sending the response RES1 to a verifier. The fourth module 104 may, for instance, comprise an output device for transmitting data, e.g. a communication interface, transmitting circuitry or a data transmitting input device.

It is noted that one or more of the modules 101, 102, 103, 104 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of verifying that a first device and a second device are physically interconnected, the method is performed by a verifier and comprising:
    sending a challenge to the first device for use as basis for input to a first physical unclonable function (PUF) part of a composed PUF, wherein the first PUF part of the composed PUF is arranged in the first device;
    receiving a response from the second device, the response is based on an output of a second PUF part of the composed PUF, wherein the second PUF part of the composed PUF is arranged in the second device; and
    verifying that the first device and the second device are interconnected when the received response and an expected response fulfill a matching criterion,
        wherein the first PUF part and the second PUF part are physically interconnected by means of a third part of the composed PUF through pins of the first device and the second device,
        wherein the third part of the composed PUF comprises two buses,
        wherein a size of the response is equal to a size of the challenge, and
        wherein a verification loop is run for a predetermined number of times by applying the response as a next challenge at a next loop iteration.

2. The method as claimed in claim 1, wherein the verifying comprises comparing the received response to a response of a challenge-response pair and verifying that the first device and the second device are interconnected when the received response and the response of the challenge-response pair fulfill the matching criterion.

3. The method as claimed in claim 2, wherein the matching criterion comprises the received response differing from the expected response by less than a defined number of bits.

4. The method as claimed in claim 1, wherein the matching criterion comprises the received response differing from the expected response by less than a defined number of bits.

5. A verifier for verifying that a first device and a second device are physically interconnected, the verifier comprising processing circuitry configured to:
    send a challenge to the first device, for use as basis for input to a first physical unclonable function (PUF) part of a composed PUF, wherein the first PUF part of the composed PUF is arranged in the first device;
    receive a response from the second device, the response is based on an output of a second PUF part of the composed PUF, wherein the second PUF part of the composed PUF is arranged in the second device; and
    verify that the first device and the second device are interconnected when the received response and an expected response fulfill a matching criterion,
        wherein the first PUF part and the second PUF part are physically interconnected by means of a third part of the composed PUF through pins of the first device and the second device,
        wherein the third part of the composed PUF comprises two buses,
        wherein a size of the response is equal to a size of the challenge, and
        wherein a verification loop is run for a predetermined number of times by applying the response as a next challenge at a next loop iteration.

6. The verifier as claimed in claim 5, wherein the processing circuitry is configured to verify by comparing the received response to a response of a challenge-response pair and verifying that the first device and the second device are interconnected when the received response and the response of the challenge-response pair fulfill the matching criterion.

7. The verifier as claimed in claim 6, wherein the matching criterion comprises the received response differing from the expected response by less than a defined number of bits.

8. The verifier as claimed in claim 5, wherein the matching criterion comprises the received response differing from the expected response by less than a defined number of bits.

9. A method of enabling verification that a first device and a second device are physically interconnected, the method is performed by the first device and comprising:
    receiving a first challenge;
    generating, based on the received first challenge, a second challenge;
    inputting the second challenge to a first physical unclonable function (PUF) part of a composed PUF, wherein the first PUF part of the composed PUF is arranged in the first device;
    providing, to a second PUF part of the composed PUF, an output from the first PUF part over a physical interconnection interconnecting the first PUF part and the second PUF part,
        wherein the second PUF part of the composed PUF is arranged in the second device,
        wherein the first PUF part and the second PUF part are physically interconnected by means of a third part of the composed PUF through pins of the first device and the second device, and
        wherein the third part of the composed PUF comprises two buses; and
    providing, in response to the second challenge and the output from the first PUF part, a response,
        wherein a size of the response is equal to a size of the second challenge,
        wherein the response is applied as a next challenge at a next loop iteration in a verification loop, and
        wherein the verification loop is run for a predetermined number of times.

10. The method as claimed in claim 9, wherein the generating comprises inputting at least part of the received first challenge to a pseudo-random number generator outputting the second challenge.

11. A first device for enabling verification that the first device and a second device are physically interconnected, the first device comprising processing circuitry configured to:
    receive a first challenge;
    generate, based on the received first challenge, a second challenge;
    input the second challenge to a first physical unclonable function (PUF) part of a composed PUF, wherein the first PUF part of the composed PUF is arranged in the first device;
    provide, to a second PUF part of the composed PUF, an output from the first PUF part over a physical interconnection interconnecting the first PUF part and the second PUF part,
        wherein the second PUF part of the composed PUF is arranged in the second device,
        wherein the first PUF part and the second PUF part are physically interconnected by means of a third part of the composed PUF through pins of the first device and the second device, and wherein the third part of the composed PUF comprises two buses, and provide, in response to the second challenge and the output from the first PUF part, a response,
wherein a size of the response is equal to a size of the second challenge,
wherein the response is applied as a next challenge at a next loop iteration in a verification loop, and wherein the verification loop is run for a predetermined number of times.

12. The first device as claimed in claim 11, wherein the processing circuitry is configured to generate by inputting at least part of the received first challenge to a pseudo-random number generator outputting the second challenge.

13. A method of enabling verification that a first device and a second device are physically interconnected, the method is performed by the second device and comprising:
receiving, in a second physical unclonable function (PUF) part of a composed PUF, a third challenge, wherein the second PUF part of the composed PUF is arranged in the second device;
receiving in the second physical unclonable function (PUF) part, an output from a first PUF part of the composed PUF, wherein the first PUF part of the composed PUF is arranged in the first device;
obtaining, in response to the third challenge and the output from the first PUF part, a response; and
sending the response to a verifier,
wherein the first PUF part and the second PUF part are physically interconnected by means of a third part of the composed PUF through pins of the first device and the second device,
wherein the third part of the composed PUF comprises two buses,
wherein a size of the response is equal to a size of the third challenge,
wherein the response is applied as a next challenge at next loop iteration in a verification loop, and wherein the verification loop is run for a predetermined number of times.

14. The method as claimed in claim 13, wherein the sending comprises sending the response to the verifier via the first device.

15. The method as claimed in claim 14, comprising, before the sending, encrypting the response.

16. The method as claimed in claim 13, comprising, before the sending, encrypting the response.

17. A second device for enabling verification that a first device and the second device are physically interconnected, the second device comprising processing circuitry configured to:
receive, in a second physical unclonable function (PUF) part of a composed PUF, a third challenge, wherein the second PUF part of the composed PUF is arranged in the second device;
receive, in the second physical unclonable function (PUF) part, an output from a first PUF part of the composed PUF, wherein the first PUF part of the composed PUF is arranged in the first device;
obtain, in response to the third challenge and the output from the first PUF part, a response; and
send the response to a verifier,
wherein the first PUF part and the second PUF part are physically interconnected by means of a third part of the composed PUF through pins of the first device and the second device,
wherein the third part of the composed PUF comprises two buses,
wherein a size of the response is equal to a size of the third challenge,
wherein the response is applied as a next challenge at next loop iteration in a verification loop, and wherein the verification loop is run for a predetermined number of times.

18. The second device as claimed in claim 17, wherein the processing circuitry is configured to send the response to the verifier via the first device.

19. The second device as claimed in 18, wherein the processing circuitry is configured to, before the sending, encrypt the response.

20. The second device as claimed in claim 17, wherein the processing circuitry is configured to, before the sending, encrypt the response.

* * * * *